United States Patent [19]

Yamamoto et al.

[11] Patent Number: 5,731,972
[45] Date of Patent: Mar. 24, 1998

[54] ELECTRONIC APPARATUS WHICH INHIBITS CONTROL OF CERTAIN OBJECTS DURING INITIALIZATION PROCESSING

[75] Inventors: Iwao Yamamoto, Tokyo; Sunao Furui, Kanagawa, both of Japan

[73] Assignee: Sony Corporation, Tokyo, Japan

[21] Appl. No.: 650,212

[22] Filed: May 20, 1996

Related U.S. Application Data

[63] Continuation of Ser. No. 110,818, Aug. 23, 1993, abandoned.

[30] Foreign Application Priority Data

Sep. 19, 1992 [JP] Japan ................. 4-274944

[51] Int. Cl.[6] ........................................... G06F 19/00
[52] U.S. Cl. ................. 364/184; 395/182.03; 395/652
[58] Field of Search ............................ 364/184, 185, 364/186, 187; 395/183.14, 182.01, 182.03, 651, 652

[56] References Cited

U.S. PATENT DOCUMENTS

| | | | |
|---|---|---|---|
| 4,028,678 | 6/1977 | Moran | 340/172.5 |
| 4,028,679 | 6/1977 | Divine | 340/172.5 |
| 4,028,683 | 6/1977 | Divine et al. | 340/172.5 |

(List continued on next page.)

FOREIGN PATENT DOCUMENTS

| | | | |
|---|---|---|---|
| 0 263 477 A2 | 4/1988 | European Pat. Off. | G06F 9/30 |
| 0 428 005 A2 | 5/1991 | European Pat. Off. | G06F 9/26 |
| 0 458 559 A2 | 11/1991 | European Pat. Off. | G06F 11/00 |

(List continued on next page.)

OTHER PUBLICATIONS

Charlie Melear "Applications for Microcomputers with E[2]PROM," Electro/86 and Mini/Micro Northeast 11 (1986), Conference Record, Los Angeles, CA, USA, pp. 1–9.

IBM Technical Disclosure Bulletin, vol. 26, No. 10B, Mar. 1984, New York, USA, pp. 5606–5607, L. Weiss, "Path Microcode Change Level Check".

IBM Technical Disclosure Bulletin, vol. 30, No. 5, Oct. 1987, "On–Site ROS Patch Mechanism," 2 pages.

IBM Technical Disclosure Bulletin, vol. 31, No. 1, Jun. 1988, "Dual Indirect RAM/ROM Jump Tables for Firmware Updates," pp. 294–298.

U.S. application No. 08/4,932, Yamamoto et al., filed Jan. 15, 1993.

U.S. application No. 08/368,758, Shimada et al., filed Jan. 4, 1995.

U.S. application No. 08/399,165, Sagane, filed Mar. 2, 1995.

U.S. application No. 08/404,115, Shimada et al., filed Mar. 3, 1995.

U.S. application No. 08/122,904, Yamamoto et al., filed Sep. 19, 1992.

H. Trinh, "Short and Long ROS Patch," *IBM Technical Disclosure Bulletin*, vol. 24, No. 3, Aug. 1981, pp. 1379–1382.

Siewiorek et al., *Comuter Structures: Principles and Examples*, pp. 581, 621–614; McGraw–Hill Publishing Company, copyright 1982.

*Primary Examiner*—Joseph Ruggiero
*Attorney, Agent, or Firm*—Limbach & Limbach L.L.P.

[57] ABSTRACT

An electronic apparatus incorporating a microcomputer capable of correcting bugs by means of patches. The microcomputer circumvents serious trouble which would usually be produced due to bugs when the power supply is turned on. After the power supply is turned on and initialization of the microcomputer itself is complete, it is determined whether the initialization processing for correcting by patches has ended. If this processing has not yet ended, the microcomputer is inhibited from controlling certain objects (e.g., circuits for driving motors that control the tape transport mechanism of a video camera) which would cause serious trouble if they were to malfunction. The microcomputer control of other objects is not so inhibited. After the end of the initialization for correcting by patches, a program capable of correcting by patches is executed.

12 Claims, 5 Drawing Sheets

U.S. PATENT DOCUMENTS

| | | | |
|---|---|---|---|
| 4,028,684 | 6/1977 | Divine et al. | 340/172.5 |
| 4,051,460 | 9/1977 | Yamada et al. | 364/900 |
| 4,095,278 | 6/1978 | Kihara | 364/900 |
| 4,150,428 | 4/1979 | Inrig et al. | 364/200 |
| 4,218,757 | 8/1980 | Drogichen | 364/900 |
| 4,291,375 | 9/1981 | Wolf | 364/483 |
| 4,296,470 | 10/1981 | Fairchild et al. | 364/200 |
| 4,319,343 | 3/1982 | Powell | 365/189 |
| 4,400,798 | 8/1983 | Francis et al. | 365/174 |
| 4,424,574 | 1/1984 | Enoki et al. | 364/DIG. 2 |
| 4,456,966 | 6/1984 | Bringol et al. | 364/900 |
| 4,490,783 | 12/1984 | McDonough et al. | 364/200 |
| 4,490,812 | 12/1984 | Guterman | 364/900 |
| 4,542,453 | 9/1985 | Patrick et al. | 364/200 |
| 4,571,677 | 2/1986 | Hirayama et al. | 364/200 |
| 4,610,000 | 9/1986 | Lee | 365/189 |
| 4,620,273 | 10/1986 | Mitani et al. | 364/189 X |
| 4,727,476 | 2/1988 | Rouchon | 364/DIG. 1 |
| 4,745,572 | 5/1988 | Wilburn | 364/900 |
| 4,751,703 | 6/1988 | Picon et al. | 371/10 |
| 4,769,767 | 9/1988 | Hilbrink | 364/200 |
| 4,802,119 | 1/1989 | Heene et al. | 364/900 |
| 4,819,154 | 4/1989 | Stiffler et al. | 364/DIG. 1 |
| 4,831,517 | 5/1989 | Crouse et al. | 364/200 |
| 4,905,200 | 2/1990 | Pidsosny et al. | 364/300 |
| 4,942,541 | 7/1990 | Hoel et al. | 364/519 |
| 4,972,481 | 11/1990 | Dantesson | 380/49 |
| 5,051,897 | 9/1991 | Yamaguchi et al. | 364/200 |
| 5,063,499 | 11/1991 | Garber | 395/500 |
| 5,077,737 | 12/1991 | Leger | 371/10.1 |
| 5,199,032 | 3/1993 | Sparks et al. | 371/3 |
| 5,214,771 | 5/1993 | Clara et al. | 364/DIG. 1 |
| 5,289,416 | 2/1994 | Iwai | 365/200 |
| 5,305,460 | 4/1994 | Kaneko et al. | 395/775 |
| 5,357,627 | 10/1994 | Miyazawa | 395/575 |
| 5,408,672 | 4/1995 | Miyazawa et al. | 395/800 |

FOREIGN PATENT DOCUMENTS

| | | | |
|---|---|---|---|
| 57-211651 | 12/1982 | Japan | G06F 11/28 |
| 58-016350 | 1/1983 | Japan | G06F 9/22 |
| 62-249231 | 10/1987 | Japan | G06F 9/22 |
| 1065633 | 3/1989 | Japan | G06F 9/22 |
| 1099129 | 4/1989 | Japan | G06F 9/22 |
| 1114941 | 5/1989 | Japan | G06F 9/22 |
| 1286029 | 11/1989 | Japan | G06F 9/06 |

ELECTRONIC APPARATUS WHICH INHIBITS CONTROL OF CERTAIN OBJECTS DURING INITIALIZATION PROCESSING

This is a continuation of application Ser. No. 08/110,818 filed on Aug. 23, 1993, abandoned.

FIELD OF THE INVENTION

The present invention relates to an electronic apparatus incorporating a microcomputer to control an electronic appliance.

BACKGROUND OF THE INVENTION

In a conventional electronic appliance used in domestic applications such as a video camera or a small-sized videocassette recorder, a microcomputer in the form of a chip has been incorporated in the body of the appliance and used to control the whole or a part of the body thereof. The microcomputer has storage means such as a read-only memory (ROM) permanently storing information and a random access memory (RAM) permitting information to be read and written into and from the RAM, a CPU for controlling access to the storage means and for performing arithmetic operations, and peripheral circuits such as input/output ports.

Such one-chip microcomputers have the advantage that their costs can be reduced greatly by mass-production. Furthermore, the program amount stored in ROMs has been vastly increased especially because of recent developments in semiconductor integration techniques. Therefore, increasingly more diverse and more complex processing has come to be executed under the control of programs stored in the ROMs.

In a modern electronic apparatus having a one-chip microcomputer for controlling the operation of an electronic appliance as described above, a large amount of program is stored in the ROM of the microcomputer. This permits varied and complex operations. However, the increase in the amount of program stored in the ROM has incurred the problem that the ROM programs are more likely to contain bugs or glitches.

Especially, where bugs are found after mass-production of the microcomputers, it is customary to mass-produce new microcomputers in which the bugs have been corrected and to exchange the microcomputers installed in appliances with the newly fabricated ones. Alternatively, external components for correcting the bugs have been attached to the appliances. In either case, a large cost is entailed. In addition, in the case of an electronic appliance having a high mechanical density such as a video camera, the aforementioned measure consisting of attaching an external component may not be feasible as a practical matter.

Accordingly, the present invention is intended to solve the foregoing problems by using a microcomputer capable of correcting bugs by means of patches as a control device. (Hereinafter, this corrections of bugs by means of patches will sometimes be referred to as "correcting by patches"). Generally, bugs often occur under a transient condition as encountered when the power supply is turned on. Therefore, even where such a microcomputer capable of correcting patches is employed, if the microcomputer has not yet finished initialization processing for corrections by patches when the power is turned on, the function of correcting by patches does not work. Consequently, the bugs may cause the electronic appliance to malfunction, resulting in a great deal of trouble.

SUMMARY OF THE INVENTION

It is an object of the present invention to provide an electronic apparatus equipped with a control device such as a one-chip microcomputer free of the foregoing problems of the prior art techniques.

This object is achieved by an electronic apparatus comprising an electronic appliance and a control device such as a one-chip microcomputer for controlling the appliance, the apparatus being characterized in that the architecture of the control device is such that correcting patches can be used to counteract bugs which are produced due to mass-production.

In an electronic appliance according to the present invention, when the power supply is turned on and the appliance is set in operation, a program for performing initialization processing for correcting by patches, a program for controlling the appliance, and other programs are started. The novel electronic appliance is characterized in that it has a determination means for determining whether the initialization processing for correcting by patches has ended or not. When the initialization processing has not yet ended, certain objects which would normally be operated under the control of the program for controlling the electronic appliance are inhibited, according to the output signal from the determination means.

For example, in the case of a video camera controlled by a control device including a microcomputer, the aforementioned certain objects whose operation can be inhibited preferably include driver circuits for driving various motors that control the tape transport mechanism, circuits for energizing the heads for recording and erasure, and a circuit for driving a motor that actuates the optical system for the TV camera.

In the device of the present invention, with respect to these circuits, control operations performed by the microcomputer are not permitted until initialization processing for correction by patches ends. This prevents the occurrence of serious problems or faults (e.g., in the above example, damage to tape, destruction of information recorded on tape, erroneous erasure, and damage to the optical system) which would otherwise be caused by bugs when the initialization processing is not complete.

Other objects and features of the invention will appear in the course of the description thereof which follows.

DETAILED DESCRIPTION OF THE INVENTION

Figure 1:
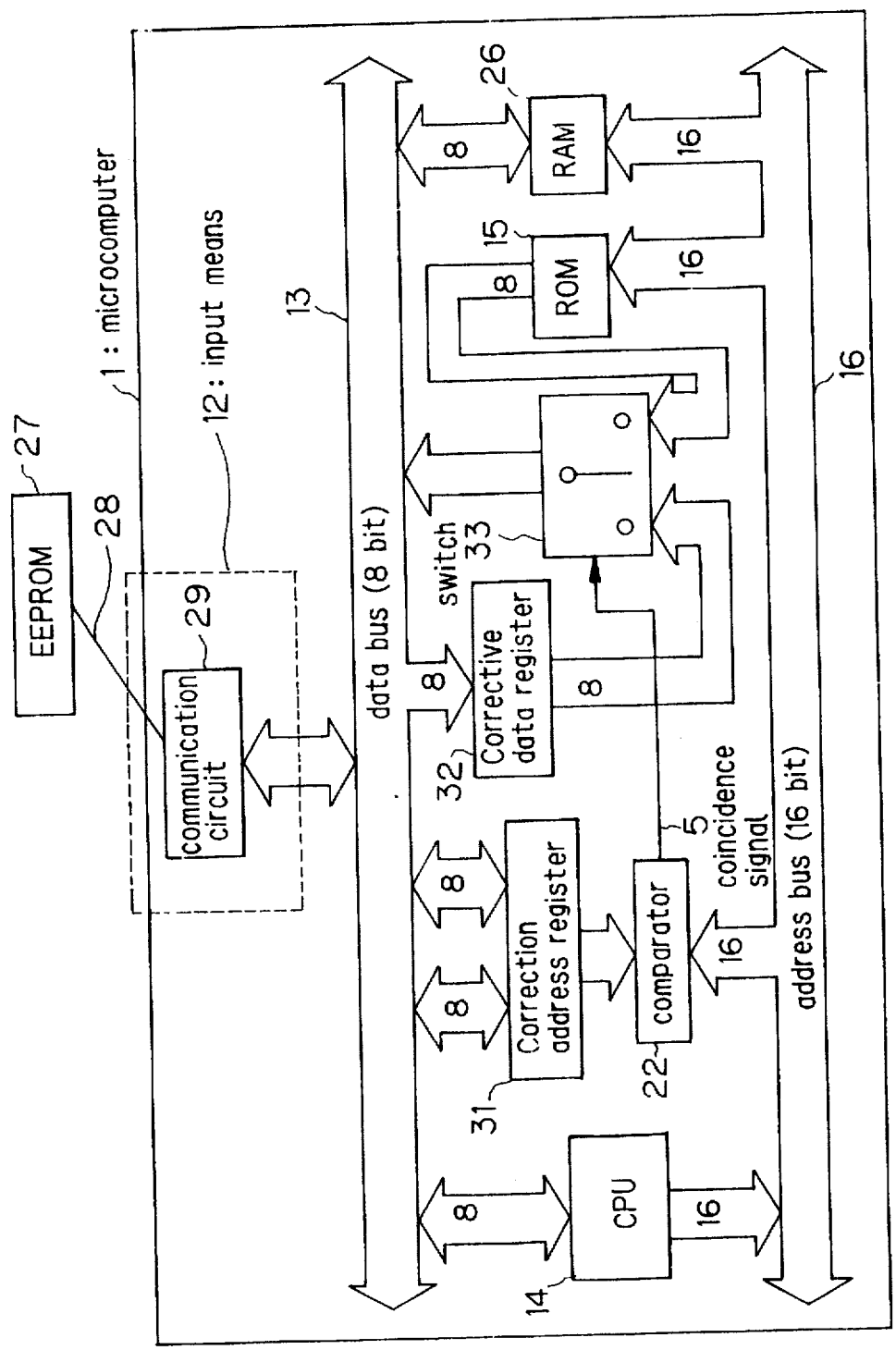
FIG. 1 is a block diagram of a microcomputer used in an electronic apparatus according to the present invention.

Referring to FIG. 1, there is shown a microcomputer used in an electronic apparatus according to the invention. This microcomputer, generally indicated by reference numeral 1, consists of one chip comprising a CPU 14, a RAM 26, a ROM 15, a data bus 13, an address bus 16, and other components, all of which are known. This microcomputer 1 further includes a correction address register 31, a corrective data register 32, a comparator 22, a switch 33, and an input means 12. This input means 12 has a communication circuit 29.

An EEPROM 27 acting as an external storage device is mounted outside the microcomputer 1. Information needed to correct bugs produced inside the ROM 15 has been supplied to the EEPROM 27 from outside and stored there. The EEPROM 27 is connected with the communication circuit 29 of the input means 12 via a cable 28.

The information needed to correct bugs is now described. This corrective information comprises the forefront addresses (hereinafter referred to as the correction addresses) of portions of the programs in the ROM 15 that are required to be modified because of the presence of bugs, programs (hereinafter referred to as software jumpers) executed instead of the portions of the programs needing modification, and addresses in the ROM 15 at which restorations are made immediately after the execution of bug-correcting programs. In principle, the software jumpers are equal in number with individual bugs present in the ROM 15. In this microcomputer, those portions of the ROM 15 which contain bugs and thus are required to be modified are replaced by their respective software jumpers and executed. The bugs are corrected by corrections by patches.

An example of the overall operation for controlling the electronic appliance by this microcomputer 1 is described below by referring to the flowchart of FIG. 2. The power supply is turned on to activate the microcomputer 1. First, initialization of the microcomputer itself, i.e., initialization of the RAM and various registers, and initialization of communication functions and ports are carried out (step 27). When this initialization processing ends, an address at which the subsequent processing is carried out is set (step 22). Then, it is determined whether initialization processing for corrections by patches has ended or not (step 23). This initialization processing for corrections by patches comprises operations for reading the corrective information stored in the EEPROM 27 into the microcomputer 1 via the input means 12. More specifically, these operations include an operation for copying the corrective information into the RAM 26, an operation for calculating the forefront addresses of the individual software jumpers contained in the corrective information copied into the RAM 26 and for loading the calculated forefront addresses into a table in the RAM 26, an operation for loading the addresses of corrections into the correction address register 31, and an operation for loading the corrective data into a corrective data register 32.

If the result of the determination in step 23 is that the initialization processing for corrections by patches is not yet complete, it is determined whether the contents of the processing addressed in step 22 relate to an operation for controlling given objects (step 24).

As described previously, examples of the given objects controlled are those objects controlled by the microcomputer inside the electronic appliance which would result in especially serious trouble or faults if they were to malfunction. Where the controlled electronic appliance is a video camera, examples of the given objects include driver circuits for driving various motors that control the tape transport mechanism, circuits for energizing the heads for recording and erasure, and a circuit for driving a motor that actuates the optical system for the TV camera.

If the result of the decision is that the contents of the addressed processing do not relate to any of the given objects controlled, the processing is executed (step 25). If the contents of the addressed processing relate to any one of the given objects, the processing is not carried out. Control then goes to step 26, where an address at which the next processing is performed is set. Subsequently, control returns to step 23.

In this way, the control operation for controlling the given objects is not performed until the initialization processing for corrections by patches has ended. Therefore, in the case of the aforementioned video camera, various problems are prevented. Examples of these problems are: (1) the cassette is erroneously ejected before tape is fully wound in the cassette, thus damaging the tape; (2) either the erasure head or the recording head is erroneously energized although the mode of operation is not a recording mode, thus destroying information on the prerecorded tape; and (3) erroneous operation of the zoom mechanism, the stop, or the focusing mechanism produces rattle, thus making the user uncomfortable.

In this way, a loop formed by steps 23–26 is repeated until the initialization processing for corrections by patches ends. Step 25 included in this loop includes the above-described initialization processing for correction by patches, processing for collecting information from various sensors and switches inside the electronic appliance, and calculations for deriving control signals to be applied to various mechanisms inside the appliance. With respect to controlled objects other than the aforementioned given objects which may result in serious trouble or malfunctions, control operations for them are started immediately after the end of the initialization processing (step 27) of the microcomputer itself, and the appliance is quickly started. These control operations which are started immediately after the end of the initialization processing may include processing for collecting information from various sensors, switches, and so on inside the electronics appliance. This may also include processing for calculating control signals applied to the various mechanisms mounted inside the electronics appliance.

When the initialization processing for correction by patches is finished by executing the above-described loop, until initialization for patch correction is complete control proceeds to a program that starts with step 12 and is capable of correcting by patches.

Figure 2:
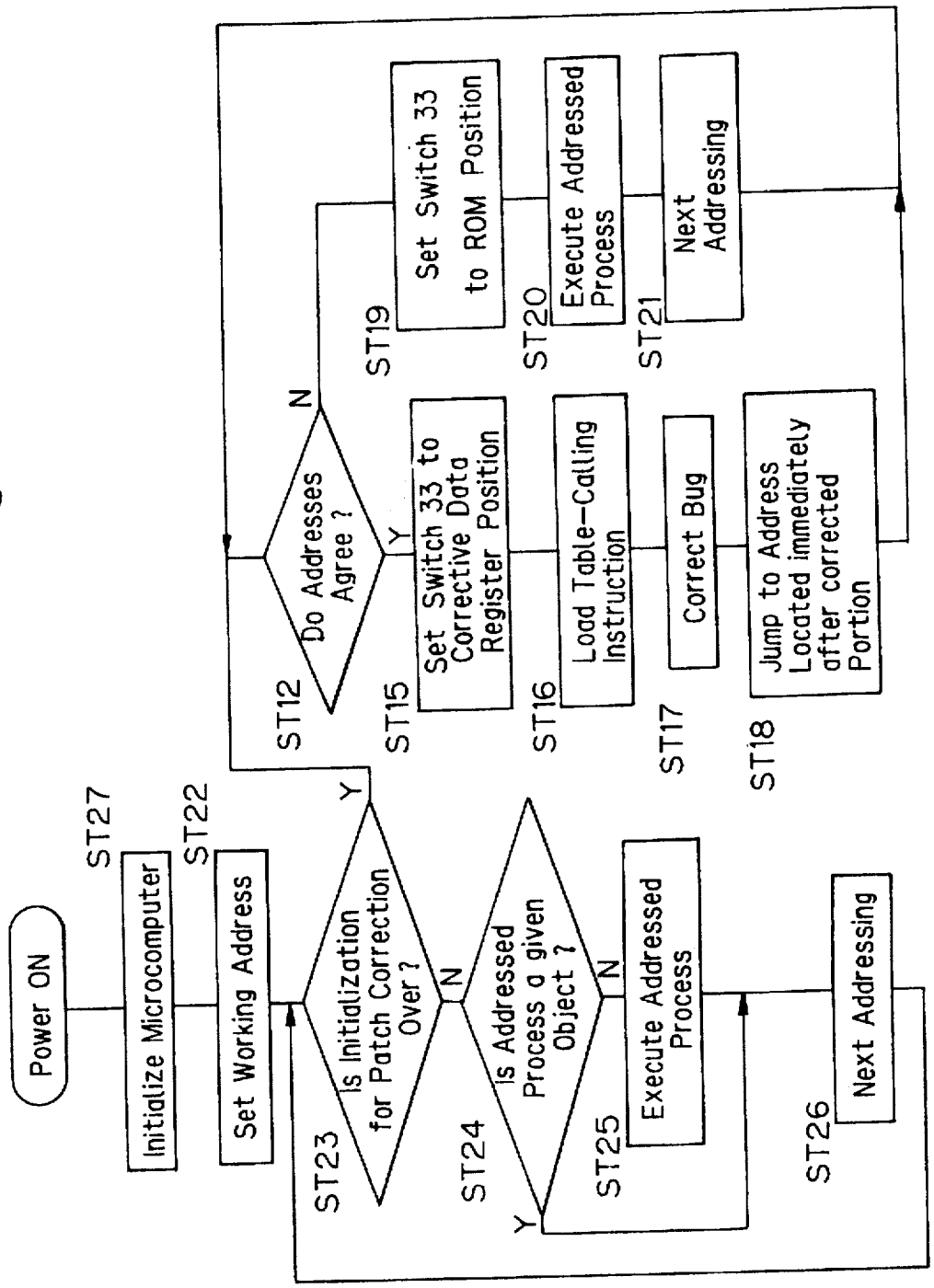
FIG. 2 is a flowchart illustrating one example of the operation of the microcomputer shown in FIG. 1.

In this program, the correction address loaded in the correction address register 31 is compared with the execution address in the CPU 14 by the comparator 22 shown in FIG. 1, the execution address being supplied through the address bus 16 (step 12 of FIG. 2). Before the execution address in the CPU 14 reaches that portion in a normal program inside the ROM 15 which should be corrected because of the presence of a bug in the normal program used to control the electronic appliance, i.e., before any correction address is reached, the output signal from the comparator 22 keeps the movable terminal of the switch 33 connected with a fixed terminal located on the side of the ROM 15, i.e., the ROM position (step 19). Thus, processing at the execution address is performed (step 20), and the next execution address is set (step 21).

The execution of the program is made to progress by repeatedly executing a loop consisting of steps 12, 19, 20, and 21. If the execution address reaches any correction address, a coincidence signal 5 appears at the output of the comparator 22. This coincidence signal 5 is supplied to the switch 33. This switches the movable terminal of the switch 33 to a fixed terminal on the side of the corrective data register 32 (step 15).

This switching operation permits the CPU 14 to receive corrective data, i.e., an instruction for calling up a table, instead of the normal program in the ROM 15. This instruction is stored in the corrective data register 32 and consists of 1 byte of data. Then, an operation for calling up a subroutine to the address stored in the called-up table is carried out. A program for correcting the bug is loaded at this called-up address and at the following addresses (step 16). The correction of the bug is then effected (step 17).

In the present example, instructions for calling up tables have been previously prepared for individual bugs. Whenever correction of a bug is performed, a table-calling instruction corresponding to a correction of a bug to be carried out next is loaded into the corrective data register. Similarly, each time correction of a bug is performed, the correction address held in the correction address register is replaced by a correction address corresponding to a correction of a bug to be executed next.

In the final step of bug correction, a jumping operation for returning to an address located immediately after the corrected portion in the ROM 15 is performed (step 18). Then, execution of a normal program in the ROM 15 is resumed.

In the patch correction of this embodiment, control goes to a bug correction program from a normal program loaded in the ROM 15 by the use of a one-byte table-calling instruction as described above. When the execution of the bug correction program ends, a jumping instruction causes control to return to the normal program from the bug correction program. Therefore, a bug-correcting program can be given to any corrected portion of the normal program, irrespective of the length of the corrected portion. Furthermore, the length of this program can be adjusted at will if necessary. In consequence, any bugs in a normal program can be effectively corrected.

Especially, in a microcomputer capable of changing only 1 byte to correct a patch, even if the microcomputer has no 1-byte instruction for causing control to jump to any arbitrary address, a patch-correcting program of any size can be created by adopting a 1-byte table-calling instruction and a jumping instruction, as in this embodiment.

Step 17 (FIG. 2) for correcting bugs is described below in detail. In order to execute a program for correcting bugs, it is necessary to perform a pretreatment operation prior to execution of all of individual software jumpers stored in the RAM 26, i.e., processing for activating the software jumpers. In the present embodiment, a program for correcting bugs is composed of software jumpers and a program for activating the jumpers.

Figure 3:
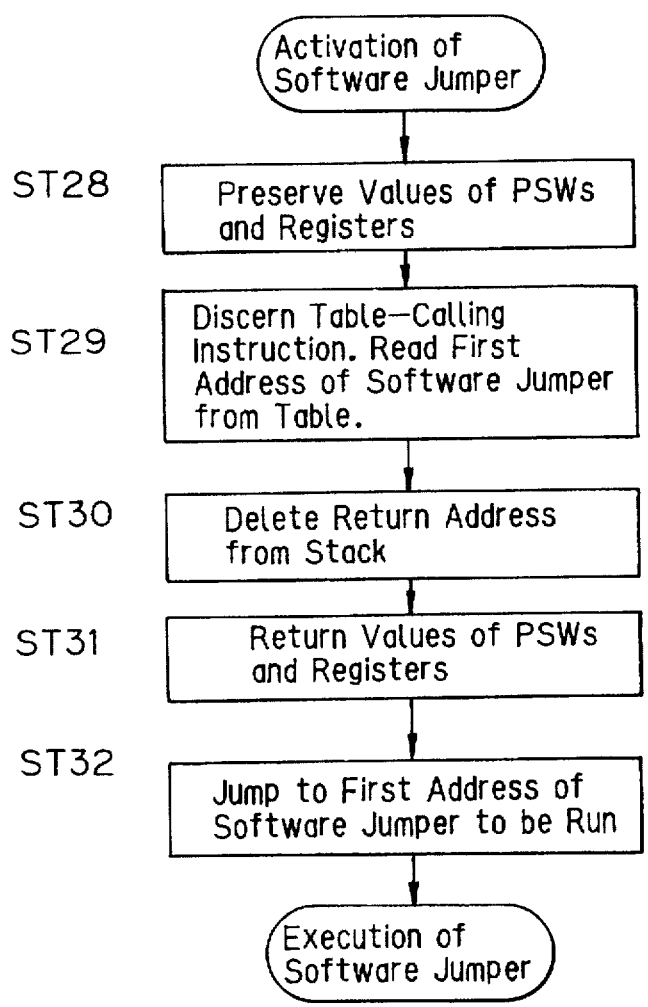
FIG. 3 is a flowchart illustrating processing for activating a software jumper in the microcomputer shown in FIG. 1.

A program for processing software jumpers is described first by referring to FIG. 3. In this embodiment, the microcomputer 1 is so constructed that a program for activating software jumpers is stored in a given region of the ROM 15. The forefront address of the given region storing the aforementioned program for activating software jumpers is stored at the table address specified by a table-calling instruction stored in the corrective data register 32. The CPU 14 of the microcomputer 1 accepts the above-described table-calling instruction and starts execution of the program for activating software jumpers.

immediately after processing for activating the software jumpers is started, the values of program status words (PSWs) for the microcomputer 1 and the values of various registers are preserved in the RAM 26 (step 28). These preserved values are returned to this processing immediately before control jumps to the forefront address of a software jumper to be run in the RAM 26 (step 31).

These preserving and returning operations produce the same effect as when execution of software jumpers is started immediately after generation of an instruction for calling up a table, irrespective of changes in the internal state of the microcomputer 1 during activation of the software jumper.

After the preserving operation of step 28 described above, a table-calling instruction which triggered the present processing for activating the software jumper determines which of the software jumpers should be executed. According to the result of this determination, the forefront address of the software jumper to be executed is read from the table in the RAM 26 storing the forefront addresses of all the software jumpers in the above-described initialization processing for correcting patches (step 29).

When an instruction for calling a table is subsequently generated, the return address stored in a stack of a RAM is deleted (step 30), for the following reason. In this embodiment, the instruction for calling up a table causes the bug-correcting program to branch. After the execution of this program, a jump instruction causes control to return to the normal program. This dispenses with the return address pushed onto the stack on generation of the table-calling instruction.

Therefore, where the aforementioned deleting operation, or a pop operation, is not performed, each time a program for correcting a bug is carried out, only pushing onto the stack is done. This keeps increasing the amount of data stored in the stack. Finally, other data stored outside the stack of the RAM may be destroyed. The deleting operation described above is performed to prevent this destruction.

Then, the value preserved as described previously is caused to return (step 31). Thereafter, a jump to the forefront address of the software jumper read out in step 29 is caused (step 32), followed by execution of the software jumper.

Figure 4:
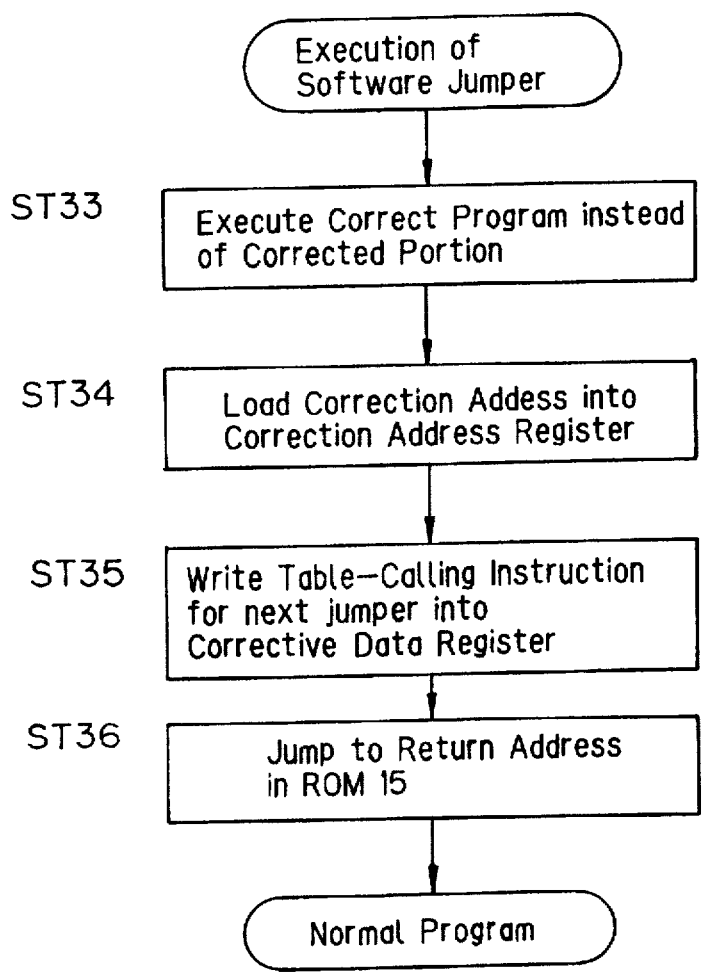
FIG. 4 is a flowchart illustrating the operation of a software jumper in the microcomputer shown in FIG. 1.

Steps for execution of a software jumper are described next by referring to FIG. 4. In a software jumper, a correct working program that replaces a corrected portion of the ROM 15 is executed (step 33).

After the end of this execution, the correction address of the next corrected portion is loaded into the correction address register (step 34). A table-calling instruction corresponding to a software jumper to be executed next is loaded into the corrective data register (step 35), thus preparing for the bug correction to be performed next. Where the correction address is only one, the above-described processing for rewriting data in these correction address register and corrective data register can be omitted. Finally, a jump to the return address in the ROM 15 is performed, for resuming execution of normal program (step 36).

Figure 5:
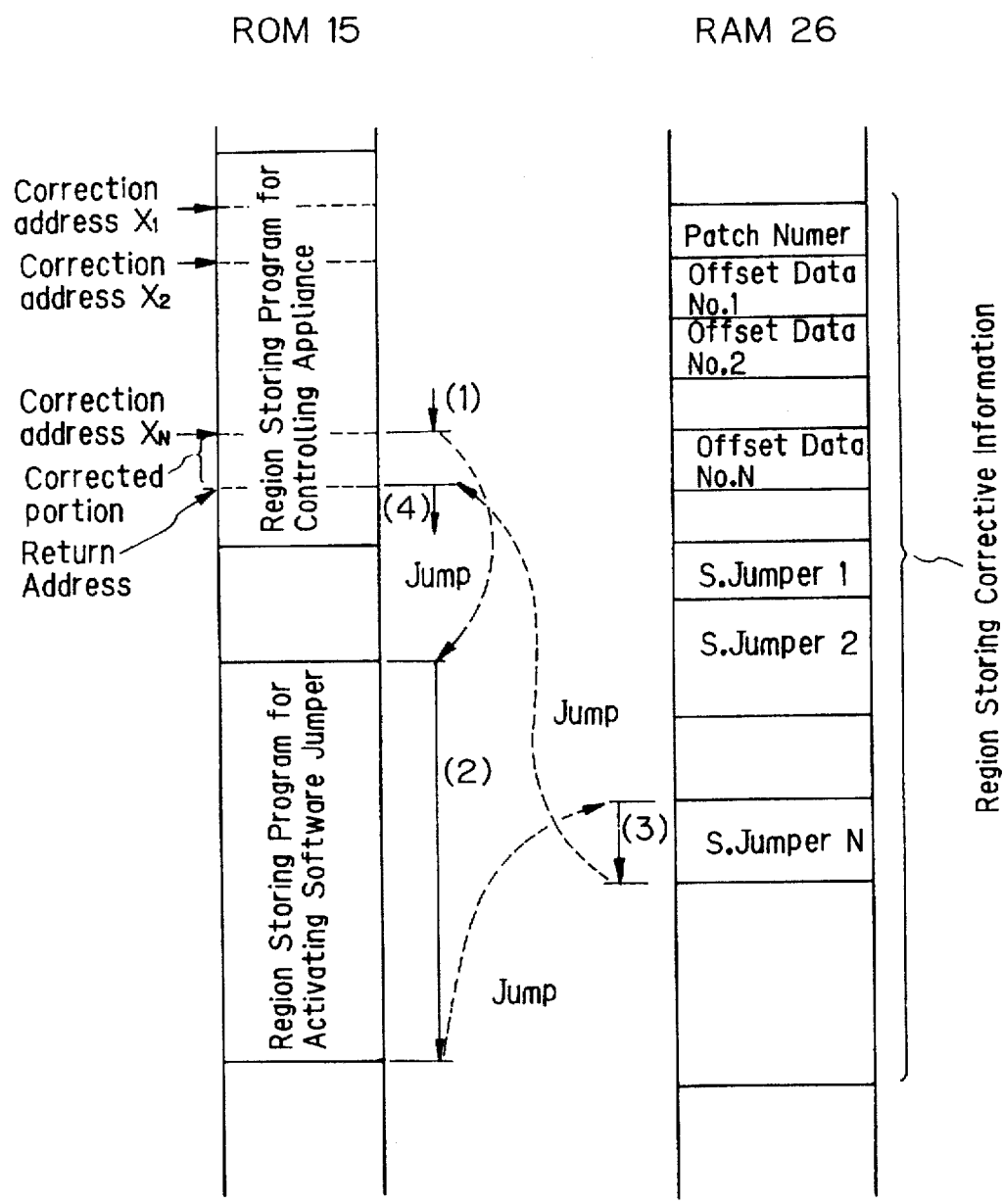
FIG. 5 is a diagram illustrating the flow of address maps about the microcomputer shown in FIG. 1.

The progress of the corrections by patches described thus far is illustrated in FIG. 5, along with the address maps of the ROM 15 and of the RAM 26. In this figure, the execution address of a normal program arrives at correction address $X_N$ and then a jump to execution of a bug-correcting program is performed. Subsequently, control returns to a normal program in the ROM 15. The process progresses in the order indicated by (1), (2), (3), and (4).

Finally, corrective information copied from the EEPROM 27 to the RAM 26 is described by referring to FIG. 5. Individual software jumpers 1, 2, etc. contained in the above-described corrective information are stored successively and closely from the foremost software jumper in the corrective information storage region of the RAM 26 shown in FIG. 5. This format of storage can greatly save the storage regions in the EEPROM 27 and in the RAM 26 to which data is copied.

Where this format of storage is adopted, the foremost address of each software jumper varies according to the length of the preceding software jumper and is not kept constant. To know the foremost address, offset data is contained in the corrective information as shown in FIG. 5.

The offset data represents the difference between the foremost address of the illustrated corrective information storage region and the foremost address of the region storing software jumpers. For example, offset data No. 1 represents the difference between the foremost address of the above-described corrective information storage region and the foremost address of the region storing software jumper 1.

In the above-described initialization processing for correcting patches, the foremost address of each software jumper in the RAM 26 is calculated by adding the value of the corresponding correcting offset data item to the foremost address of the corrective information storage region in the RAM 26. The calculated foremost addresses are loaded into a table in the RAM 26.

As described in detail in connection with the embodiment described thus far, the present invention pertains to an electronic apparatus incorporating a microcompute to control the appliance. Of course, the invention is not limited to the structure of this embodiment. For instance, the structure may be modified as suggested in items (1)–(3) below.

(1) The external storage device can be mounted outside the microcomputer 1 instead of inside the microcomputer 1, as shown in FIG. 1.

(2) Calculations of the foremost addresses of software jumpers can be performed in the program for activating the software jumpers. That is, whenever a correction of a bug is executed, the foremost address of a software to be run is calculated and stored in a RAM or the like.

(3) The processing for deleting the return address pushed onto the stack on generation of a table-calling instruction can be performed in a software jumper.

As described in detail thus far, in the present invention, where bugs are found after mass-production of microcomputers or the necessity of partial modification arises, correction by patches can be performed simply by supplying corrective information from the outside; in the past, an external circuit was required to be attached or new microcomputers mass-produced, thus incurring high costs.

In a transient state where bugs tend to be produced as encountered when the power supply is turned on, certain controlled objects which tend to produce serious problems if they malfunction are not controlled until processing for correcting patches ends. Thus, the electronic appliance can be prevented from malfunctioning if bugs take place in a transient state.

Where a corrective information storage region having a sufficient storage capacity is not secured in the microcomputer, the aforementioned method of saving the storage region is utilized. Hence, ample correcting function can be obtained.

What is claimed is:

1. An electronic apparatus having a microcomputer and an electronic appliance equipped with a plurality of objects controlled by the microcomputer, said microcomputer comprising:
   means for correcting by patches;
   means for executing initialization processing for corrections by patches by the means for correcting by patches;
   determination means for determining whether said initialization processing has ended; and
   means for inhibiting the microcomputer from controlling certain ones of said objects until said initialization processing has ended.

2. The electronic apparatus of claim 1, wherein said certain ones of the objects, which the microcomputer is inhibited from controlling, comprise a driver circuit for a motor that controls a tape transport mechanism.

3. The electronic apparatus of claim 1 or 2, wherein said certain ones of the objects, which the microcomputer is inhibited from controlling, comprise a circuit for energizing heads mounted in a tape transport mechanism.

4. The electronic apparatus of any one of claims 1 or 2, wherein said certain ones of the objects, which the microcomputer is inhibited from controlling, comprise a circuit for driving a motor that drives an optical system for a television camera.

5. The electronic apparatus of claim 1, wherein said microcomputer further comprises means for performing said initialization processing and, at the same time, executing processing to collect information from various sensors and switches inside the electronic appliance.

6. The electronic apparatus of claim 1, wherein said microcomputer further comprises means for performing said initialization processing and, at the same time, executing processing to calculate control signals applied to various mechanisms mounted inside the electronic appliance.

7. The electronic appliance according claim 1, wherein the microcomputer includes means for simultaneously performing initialization processing and controls at least a first object of the plurality of objects controlled by the microcomputer, whereby the first object is not one of said certain ones of said objects which the microcomputer is inhibited from controlling.

8. The electronic appliance according to claim 1, wherein the microcomputer is constituted on a single semiconductor integrated circuit chip.

9. A method of controlling a single chip microcomputer and an electronic appliance equipped with a plurality of objects controlled by the microcomputer, comprising the steps of:
   executing initialization processing for effecting correcting a program stored in a read-only memory of the microcomputer by means of patches;
   determining whether said initialization processing has ended; and
   if said initialization processing has not yet ended, inhibiting the microcomputer from controlling certain ones of said objects which could result in malfunction of the appliance if control of such objects is defective without the patch correction.

10. The electronic appliance according to claim 1, wherein the means for correcting by patches comprises means for receiving patch information from an electronically erasable programmable read only memory which is external to the microcomputer.

11. A microcontroller for controlling an electronic appliance equipped with a plurality of objects, the microcontroller comprising:
   a read only memory for storing a control program;
   a central processing unit for controlling the plurality of objects according to the control program stored in the read only memory;
   a communication circuit for receiving patch information, with the patch information comprises a correction address corresponding to an address of the read only memory where a bug is located and a software jumper for replacing the portion of the control program having the bug;
   correction address register means for storing the correction address received by the communication circuit;

a random access memory for storing the software jumper received by the communication circuit at a forefront address;

corrective address register means for calculating the forefront address and storing the forefront address in a table located in the random access memory; and means for inhibiting the central processing unit from controlling at least one object of the plurality of objects until the correction address register has stored the correction address, the random access memory has stored the software jumper, and the corrective address register means has stored the forefront address in the table.

12. A method of controlling a single chip microcomputer, a random access memory and an electronic appliance equipped with a plurality of objects controlled by the microcomputer, comprising the steps of:

performing initialization processing, comprising the steps of:

copying at a software jumper to the random access memory from an external source;

calculating a forefront address of the at least one software jumper in the random access memory;

loading the forefront address into a table in the random access memory;

loading a correction address into a correction address register; and loading corrective information into a corrective data register; and during the initialization processing, inhibiting the control by the microcontroller of at least one of the objects;

determining when initialization processing has ended; and after initialization processing has ended, performing further processing, comprising the steps of:

checking whether an execution address coincides with the correction address in the correction address register;

receiving the corrective data, by the microcontroller, when it is determined that the execution address coincides with the at least one correction address;

calling up the table having the forefront address of the software jumper, based on the received corrective data; and executing the software jumper at the forefront address of the random access memory, to thereby correct a bug by means of a patch.

* * * * *